United States Patent [19]

Sawano et al.

[11] Patent Number: 6,028,617

[45] Date of Patent: Feb. 22, 2000

[54] METHOD OF RECORDING AN IMAGE

[75] Inventors: Mitsuru Sawano; Shu Shirai, both of Shizuoka-ken; Akihiro Sadaki, Chiba, all of Japan

[73] Assignees: Fuji Photo Film Co., Ltd., Kanagawa; Seiko Instruments Information Device Inc., Chiba, both of Japan

[21] Appl. No.: 08/779,896

[22] Filed: Jan. 7, 1997

[30] Foreign Application Priority Data

Jan. 17, 1996 [JP] Japan .................................. 8-006137

[51] Int. Cl.$^7$ ................................................ B41J 2/325
[52] U.S. Cl. ................................. 347/183; 347/172
[58] Field of Search ............................ 347/15, 43, 172, 347/183; 358/298, 500; 395/109

[56] References Cited

U.S. PATENT DOCUMENTS 5,717,448 2/1998 Inada .................................... 347/43

FOREIGN PATENT DOCUMENTS

| 5-155057 | 6/1993 | Japan | B41J 2/355 |
| 7-117359 | 5/1995 | Japan | B41M 5/30 |
| 7-312677 | 11/1995 | Japan | H04N 1/04 |

*Primary Examiner*—Huan Tran
*Assistant Examiner*—Shih-Wen Hsieh
*Attorney, Agent, or Firm*—Sughrue, Mion, Zinn, Macpeak & Seas, PLLC

[57] ABSTRACT

A method of recording an image in which a multicolor image is recorded by moving in a subscanning direction a head having recording elements arrayed in a main scanning direction to make variable the density or area ratio of each pixel in correspondence with an image density, and by combining the colors of yellow, magenta, cyan, and black, wherein each color is recorded by dots arranged at a fractional dot cycle in the sub canning direction, so as to prevent color moire due to misregistration.

4 Claims, 12 Drawing Sheets

| | K | C | M | Y |
|---|---|---|---|---|
| SUBSCANNING DIRECTION | 300 DPI | 250 DPI | 200 DPI | 300 DPI |
| MAIN SCANNING DIRECTION | 150 DPI | 75 DPI | 150 DPI | 75 DPI |

| | K | C | M | Y |
|---|---|---|---|---|
| SUBSCANNING DIRECTION | 300 DPI | 250 DPI | 200 DPI | 300 DPI |
| MAIN SCANNING DIRECTION | 150 DPI | 75 DPI | 150 DPI | 75 DPI |

Y: NORMALLY ARRANGED PATTERN*

M: 3/4 ARRANGEMENT PATTERN*

C: 3/5 ARRANGEMENT PATTERN*

K: 1/2 ARRANGEMENT PATTERN*

*: DECLINE NOTED IN RESOLUTION MAIN SCANNING DIRECTION

FIG. 6
PRIOR ART
FIG. 7
PRIOR ART
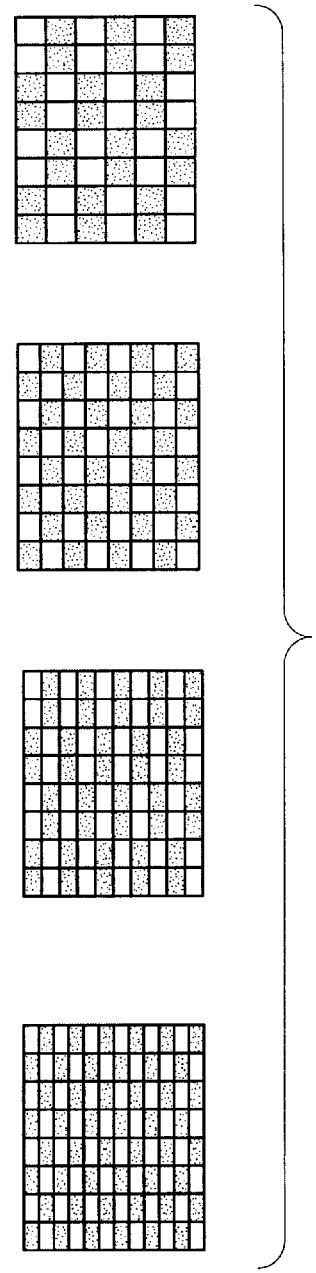
FIG. 8
PRIOR ART

NORMALLY ARRANGED PATTERN

RANDOMLY ARRANGED PATTERN

2/3 ARRANGEMENT PATTERN

1/2 ARRANGEMENT PATTERN

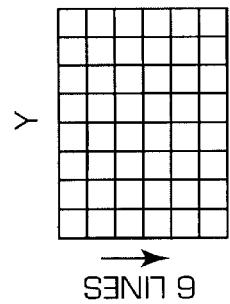
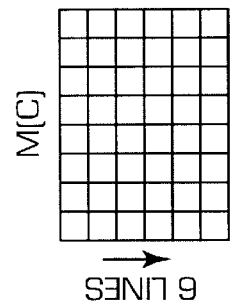
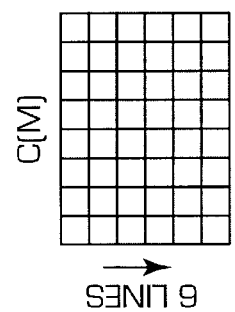
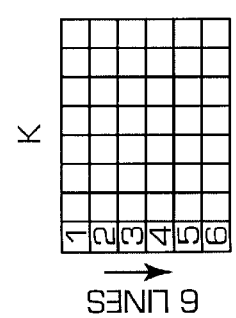
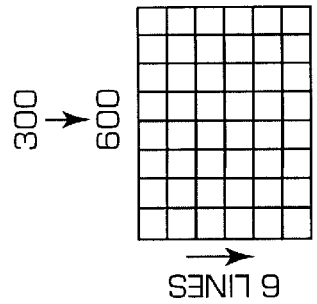
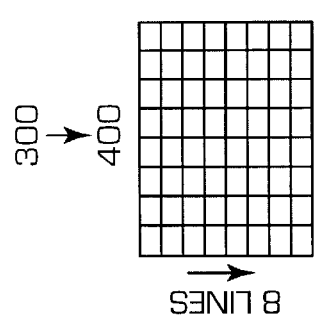
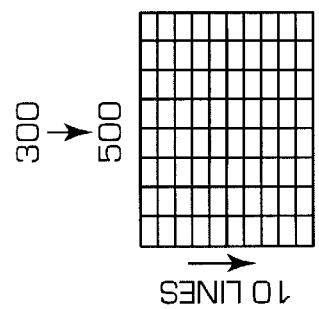
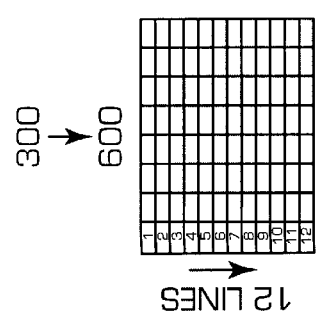
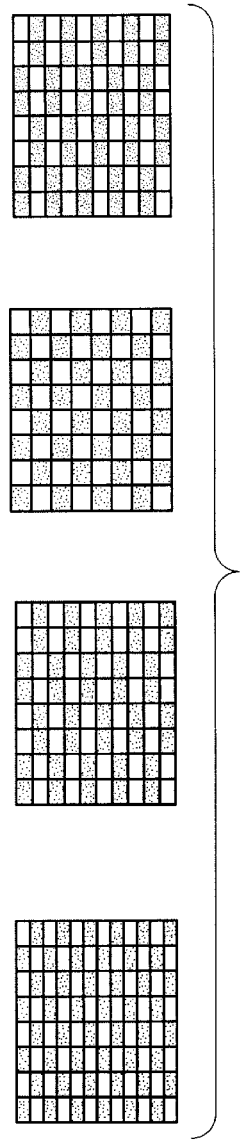
FIG. 13  FIG. 14  FIG. 15

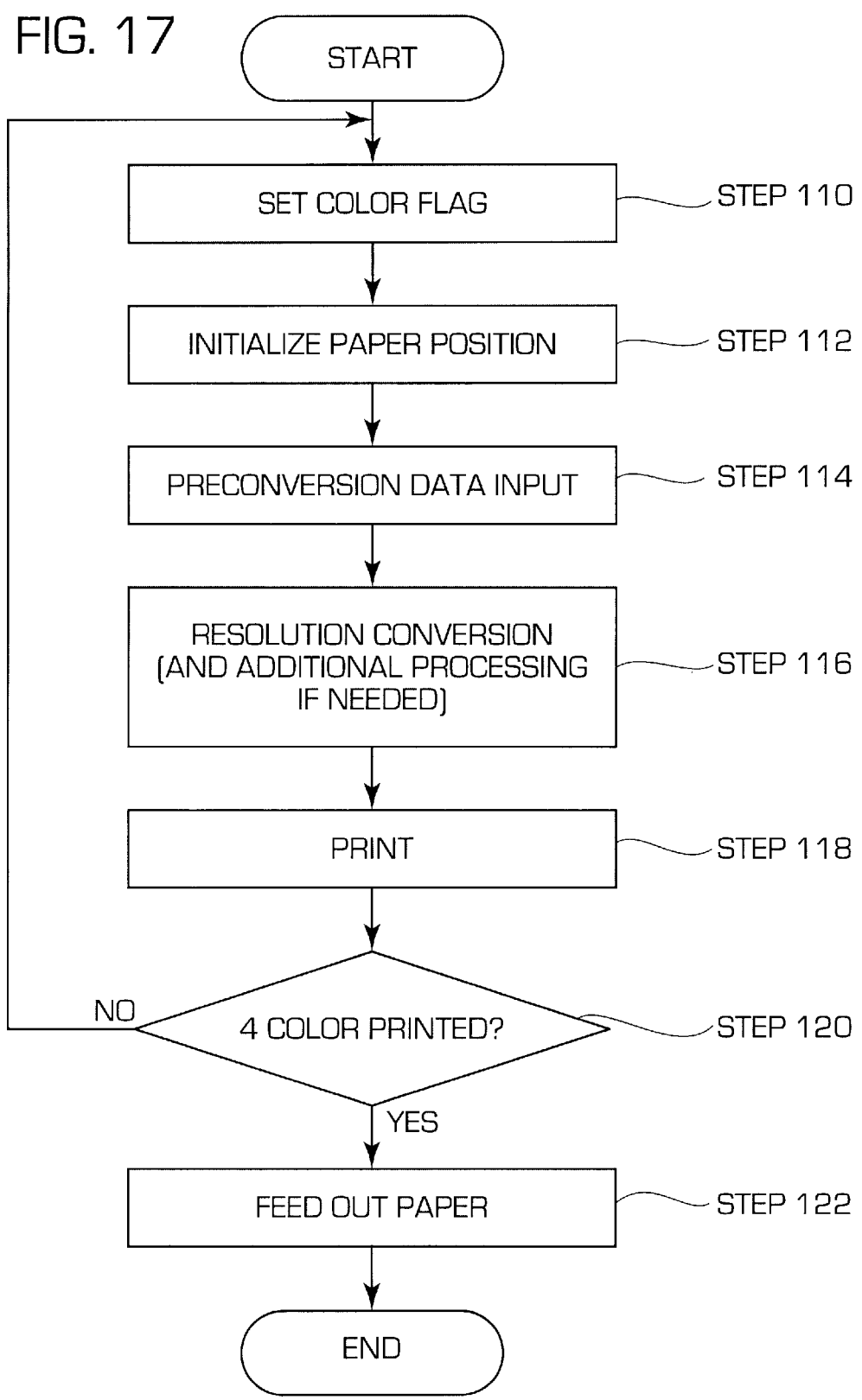

METHOD OF RECORDING AN IMAGE

BACKGROUND OF THE INVENTION

1. Field of the Invention

The present invention relates to a method of recording an image which makes it possible to display a multiplicity of colors with a multiplicity of gradations by making dot pitches with respect to the separation of each color relatively variable among various colors.

2. Description of the Related Art

As a means for obtaining a recording of a multiplicity of colors with a multiplicity of gradations, it is possible to cite, for example, the halftone dot gradation representation for representing a desired gradation by making each halftone-dot area variable in correspondence with the gradation. In this case, a recording is effected by superimposing dots of respective colors having identical shapes one on top of another so as to cope with a multicolor recording. However, in the event that a misregistration should occur for each recording, color moire would result.

To avoid the aforementioned color moire, it is possible to cope with the problem by improving the mechanical accuracy. However, since a technical difficulty is involved, the color moire is avoided in fields such as offset printing by varying the angle of arrangement of dots for each color. That is, instead of arranging the dots regularly in grid form, the angle of arrangement of the dots with respect to the main scanning direction is changed by 15°, 30°, 45°, or 75°.

Also, a means is known for suppressing the color moire by means of random dots, which are free of directionality for each color, by adopting the so-called FM screening in which dots of a predetermined size are arranged at random in correspondence with a gradation.

The above-described means is capable of effectively suppressing the occurrence of color moire in a case where dot pitches in the main scanning direction and subscanning direction can be set to be smaller than a minimum unit area in image processing which is dependent on an image processor of an image recording apparatus. However, in the case of line heads, such as a thermal head, a liquid-crystal head, a light-emitting diode (LED) head, and an electroluminescence (EL) head, in which the dot pitch in the main scanning direction is restricted by the size of a recording element and is substantially set to the aforementioned minimum unit area, the degree of freedom in the change of the dot pitch is limited to the subscanning direction. Accordingly, it is not possible to suppress moire fringes effectively.

To overcome the above-described situation, a method of recording a color image disclosed in Japanese Patent Application Laid-Open No. 5-155057 has been proposed. According to this method, respective pixels of the three primary colors are alternately offset by about ½ pitches in the subscanning direction so that the pixels of the three primaries are not arranged linearly in the main scanning direction, and the pixel length of one of the three primaries in the subscanning direction is set to be ½ of the pixel length of the other colors. As a result, even if a misregistration occurs, color patterns in two adjacent rows are maintained in a relationship of complementary color. Hence, the entire tone of color does not change, and it is possible to make the irregularity in color less conspicuous. However, even in the case where the multiplicity of colors are represented with the multiplicity of gradations by changing the angle of arrangement of halftone dots, it is difficult to obviate the occurrence of color moire which is called a rosette pattern which constitutes a factor for harsh texture.

In addition, according to the method of recording a color image disclosed in JapaneEe Patent Application Laid-Open No. 5-155057, even in the case where the dot pitch in the main scanning direction is limited, the color moire can be suppressed effectively in the case of three colors. This being the case, however, it is difficult to obviate the color moire which occurs in a case where a multiplicity of colors are recorded with a multiplicity of gradations through the four-color separation which is widely adopted in printing or graphic arts.

To overcome the above-described situation, a method of recording a color image disclosed in Japanese Patent Application Laid-Open No. 7-312677 (hereinafter referred to "Prior Invention") has been proposed.

In accordance with a first aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, wherein the pixel for each of the colors is constituted by a dot and/or a blank, the dot having a substantially fired shape and a variable density, and/or the dot having a substantially fixed density and a variable shape, comprising the steps of: recording one color with an arrangement pattern having a particular fixed dot pitch; and recording at least two of the colors with respective patterns in which dot pitches in the subscanning direction are set to mutually different fractional multiples of the dot pitch of the one color.

In accordance with a second aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, comprising the step of: setting a dot pitch ratio of colors of yellow, magenta cyan, and black to 1:0.75:0.60:0.50 in random order.

In accordance with a third aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, comprising the steps of: recording the colors with respective patterns in which dot pitches in the subscanning direction are set to mutually different fractional multiples of the dot pitch of one particular color; and increasing the dot pitch in the main scanning direction of one or more colors to lower a resolution in the main scanning direction of the particular color.

In accordance with a fourth aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, comprising the step of: recording each of the colors with a pattern having a dot pitch in which dots are arranged randomly in the subscanning direction.

In accordance with a fifth aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, comprising the steps of: recording one color with a dot arrangement pattern having a particular fixed dot pitch; and recording another color with a dot arrangement pattern having a dot pitch in which dots are arranged randomly in the subscanning direction.

In accordance with a sixth aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, comprising the steps of: recording yellow with a pattern having a dot pitch in which dots are arranged randomly in the subscanning direction; and recording magenta, cyan, and black with respective fixed dot pitch patterns in which dot pitches in the subecanning direction are set to mutually different fractional multiples of the dot pitch of yellow.

In accordance with a seventh aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, comprising the step of: setting dot pitch ratios of colors of yellow, magenta cyan, and black in the main scanning direction and the subscanning direction to 2:1:2:1 and 1:0.75:0.60:0.50, respectively.

In accordance with an eighth aspect of the Prior Invention, there is provided a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magneta, cyan, and black, comprising the step of: setting dot pitch ratios of colors of yellow, magenta cyan, and black in the main scanning direction and the subscanning direction to 2:2:1:1 and 1:0.60:0.75:0.50, respectively.

In accordance with a ninth aspect of the Prior Invention, the method of recording an image according to the seventh aspect of the invention may further comprise the step of: consecutively executing in a predetermined pixel cycle a resolution conversion operation in which a resolution in the subscanning direction in color separation of yellow, magenta, cyan, and black each having a predetermined resolution is converted by interpolation processing, and a mask operation in which masks each having a predetermined pattern are superimposed on respective color-separated images with resolutions thereof converted, and a value of gradation data of the pixel which overlaps with the predetermined pattern among the pixels is set to a 0 so as to extract gradation image data of the respective colors.

In accordance with a 10th aspect of the Prior Invention, the method of recording an image according to the ninth aspect of the invention may further comprise the steps of: performing pattern processing in which gradations of the pixels of each of the colors are allotted to elements of a submatrix which is arranged in the subscanning direction in a unit of two pixels after the resolution conversion operation; and performing cancellation processing in which a predetermined number of low-order bits of the gradation data of each of the pixels before or after the mask operation.

In accordance with an 11th aspect of the Prior Invention, the method of recording an image according to the 10th aspect of the invention may further comprise the step of: determining the number of factors of the submatrix in accordance with the value of the gradation data.

In accordance with a 12th aspect of the Prior Invention, the method of recording an image according to the ninth aspect of the invention, in the mask operation gradation data having a maximum value is extracted with respect to an image in which the value of the gradation data has a maximum value.

The Prior Invention enables effective suppression of the color moire and vertical fringes even in the case where the dot pitch in the main scanning direction is structurally fixed. However, because the dot pitch of yellow in the subscanning direction is larger than that of other colors (for example, it is two times larger than that of black which is the minimum pitch), the peak recording temperature increases in case of recording 100% density dot, resulting in over heat of the center portion of the recording dot, which causes deterioration of the recording material and deformation of the base, therefore makes it difficult to perform fine recording.

SUMMARY OF THE INVENTION

Accordingly, the present invention has been devised in view of above-described circumstances, and it is an object of the present invention to provide a method of recording an image which enables, as well as the suppression of color moire even in the case where the dot pitch in the main scanning direction is structurally fixed, fine recording with less conspicuous vertical fringes and without increasing peak recording temperature.

The first aspect of the present invention is a method of recording an image in which a multicolor image is recorded by moving in a subscanning direction a head having a plurality of recording elements arrayed in a main scanning direction to make variable a density or an area ratio of each recording pixel in correspondence with a density of an original image, and by combining colors of yellow, magenta, cyan, and black, wherein the pixel for each of the colors is constituted by a dot and/or a blank, the dot having a substantially fixed shape and a variable density, and/or the dot having a substantially fixed density and a variable shape, comprising the step of: in the subscanning direction, setting a dot pitches of yellow and black equal and setting the dot pitches of other two colors larger than that of yellow and black by a predetermined value.

The second aspect of the present invention is a method according to the first aspect, wherein a dot pitch ratio of colors of yellow, magenta, cyan, and black in the subscanning direction is set to 1:1.2:1.5:1 or 1:1.5:1.2:1.

The third aspect of the present invention is a method according to first or second aspect, wherein a dot pitch ratio of colors of yellow, magenta, cyan, and black in the main scanning direction is set to 2:1:2:1 or 2:2:1:1.

In the present specification, the term "dot" is defined as a continuous tone dot i.e., a dot having a substantially fixed shape and a variable density) and/or a halftone dot (i.e., a dot having substantially fixed censity and a variable shape). In addition, the term "pixel" is defined as a unit of image recording which consists of the dot and/or a blank. Accordingly, the "dot pitch" referred to herein represents the sum of a dot length and a blank length in a designated direction in a relevant pixel (i.e., the dot pitch represents the pixel length in a designated direction).

According to the above-described means in accordance with the present invention, when an image is recorded by a head having a plurality of recording elements arranged in a predetermined pitch, color moire can be suppressed by varying the dot pitch in the subscanning direction by a desired magnification with respect to each color separation. Further, by setting the dot pitches of yellow and black equal, the dot pitch of yellow is reduced compared to that of the Prior Invention, resulting in reduced peak recording temperature even in case of recording 100% density dot, which enables fine recording. Further, the undesired vertical fringes are less conspicuous because its color is yellow.

The above and other objects, features and advantages of the present invention will become more apparent from the following detailed description of the invention when read in conjunction with the accompanying drawings.

BRIEF DESCRIPTION OF THE DRAWINGS

FIG. 6 is a diagram illustrating processing for obtaining arrangement patterns in accordance with the Prior Invention;

FIG. 8 is a diagram illustrating processing for obtaining arrangement patterns in accordance with the Prior Invention;

FIG. 13 is a diagram illustrating processing for obtaining arrangement patterns in accordance with the present invention;

FIG. 14 is a diagram illustrating processing for obtaining arrangement patterns in accordance with the present invention;

FIG. 15 is a diagram illustrating processing for obtaining arrangement patterns in accordance with the present invention;

FIG. 17 is a schematic flow diagram of 4 color image recording in accordance with the present invention.

DESCRIPTION OF THE PREFERRED EMBODIMENT

Referring now to the accompanying drawings, a description will be given of an embodiment of the present invention.

First, the operation of the Prior Invention will be described, next, the improvement of the present invention over the Prior Invention will be described.

Figure 1A:
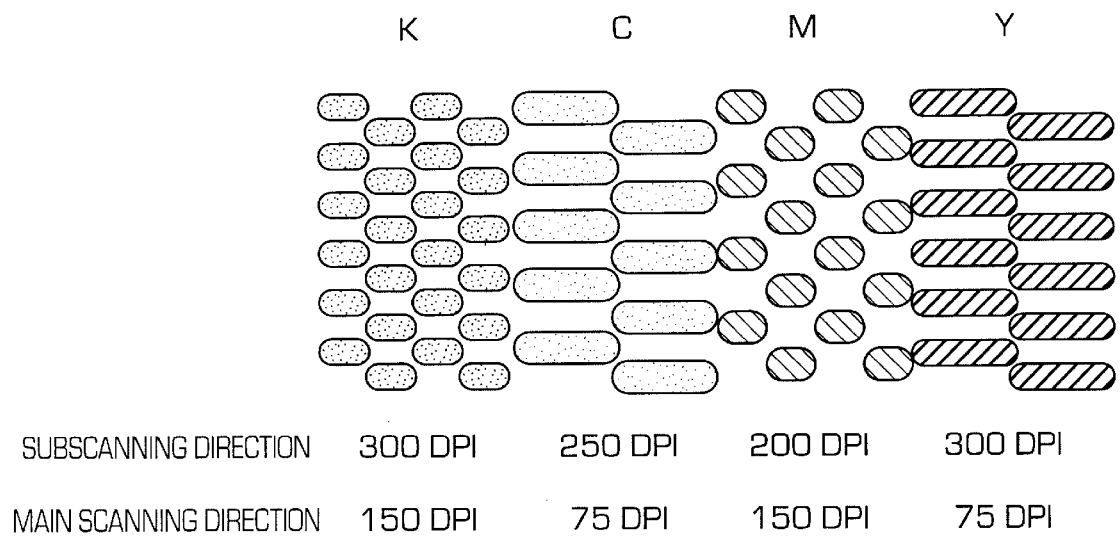
FIG. 1A and FIG. 1B are diagrams illustrating patterns in accordance with an embodiment of the present invention.

FIG. 1A shows an embodiment of the present invention, and illustrates recording patterns which are adopted for each color in a case where a multiplicity of colors are recorded with a multiplicity of gradations through the four-color separation of yellow (Y), magenta (M), cyan (C), and black (K).

Figure 11A:
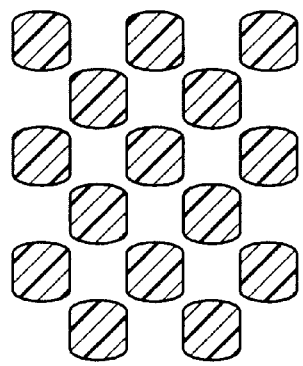
FIG. 11A through FIG. 11D are diagrams of a pattern in accordance with the Prior Invention.
Figure 11B:
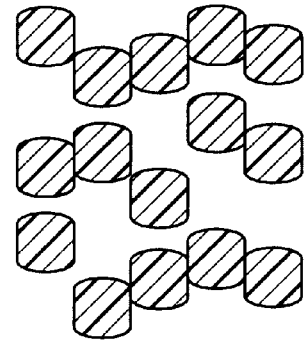
Figure 11C:
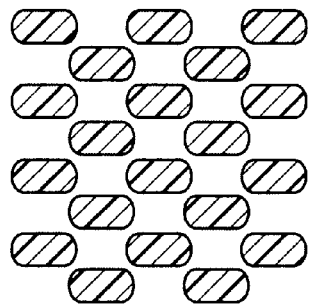
Figure 11D:
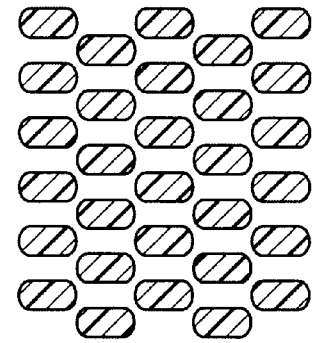

That is, FIG. 11A shows a specific normally arranged pattern in which the dots are arranged regularly. FIG. 11B shows a randomly arranged pattern in which the dots are arranged randomly in the subscanning direction. FIG. 11C shows a ⅔ arrangement pattern in which the dots with their dot pitches in the subscanning direction reduced to ⅔ of those of a normal pattern are arranged regularly. FIG. 11D shows a ½ arrangement pattern in which the dots with their dot pitches in the subscanning direction reduced to ½ of those of the normal pattern are arranged regularly.

Further, an arrangement pattern can also be formed in which the dot pitch in the subscanning direction is varied by a predetermined magnification, in the same way as in FIG. 11C and FIG. 11D.

The following shows a visual evaluation of color moire and harsh texture obtained when monotone images are recorded with respective area ratios set to 50% in the respective color separation by using a recording apparatus having a main-scanning-direction resolution of 300 dpi and a sub-scanning-direction resolution of 600 dpi and provided with a line thermal head having a main-scanning-direction length of 70 $\mu$m and a sub-scanning-direction length of 55 $\mu$m in terms of the heater size, by fixing the dot pitch in the main scanning direction to 300 dpi, and by varying the dot pitch in the subscanning direction (with the normal dot pitch set to 300 dpi) in various ways.

Incidentally, a recording was effected such that color moire was made easily observable by causing a misregistration of the colors at the time of evaluation. Recording materials used were colorants (Y, M, C, and K) used in a thermosensitive transfer recording material disclosed in Japanese Patent Application Laid-Open No. 7-117359.

That is, the thermosensitive transfer material is prepared by a process in which 0.24 g of a stearic acid amide and 60 g of n-PrOH are added to 10 g of four kinds of dispersions including the following colorants A to D so as to obtain a coating solution, and a polyester film (manufactured by TEIJIN LTD.) provided with release treatment on its reverse surfaces and having a thickness of 5 $\mu$m is coated such that dried film thickness A to D become 0.36 $\mu$m, 0.38 $\mu$m, 0.42 $\mu$m, and 0.40 $\mu$m, respectively.

| | | | |
|---|---|---|---|
| A: cyan pigment: (CI, P. B. 15:4) | 12 g | — | — |
| B: magenta pigment: (CI, P. R. 57:1) | — | 12 g | — |
| C: yellow pigment: (CI, P. Y. 14) | — | — | 12 g |
| D: carbon: (MA-100 manufactured by Mitsubishi | | | 12 g |

-continued

| | |
|---|---|
| Chemical Corp.) Butyral resin: (S-LEC FPD-1 manufactured by Sekisui Chemical Co., Ltd., with a softening point of 70° C. and an average polymerization degree of 300 or less) | 12.0 g |
| Solvent: n-propyl alcohol (n-PrOH) | 110.4 g |
| Dispersion assistant: Solsperse S-20000 (manufactured by ICI Japan Ltd.) | 0.8 g |

TABLE 1

| | Y | M | C | K | Color Moiré | Harshness | Remarks |
|---|---|---|---|---|---|---|---|
| Example 1 | normal | ½ | normal | ⅔ | Δ | ○ | |
| Example 2 | ¾ | ½ | normal | ⅔ | ○ | ○ | |
| Example 3 | ½ | 0.866 | normal | 0.259 | ○ | ○ | sin30° : sin60° : |
| Example 4 | random | random | random | random | ○ | x | sin90° : sin15° |
| Example 5 | random | random | random | normal | ○ | Δ | |
| Example 6 | random | ½ | normal | ⅔ | ○ | ○ | |
| Example 7 | ½ | random | normal | ⅔ | ○ | Δ | |
| Example 8 | normal | ¾ | ⅗ | ½ | ○ | ○ | |
| Example 9 | density | density | density | ½ | ○ | ○ | sharp black contour |
| Comparative Example 1 | normal | normal | normal | normal | x | ○ | |
| Comparative Example 2 | normal | normal | normal | none | Δ | ○ | 3 colors |
| Comparative Example 3 | normal | ½ | normal | none | ○ | ○ | 3 colors |
| Comparative Example 4 | normal | ½ | normal | ½ | x | ○ | |
| Comparative Example 5 | normal | normal | normal | ½ | x | ○ | |
| Comparative Example 6 | density | density | density | density | ○ | ○ | black blurs |

Figure 16:
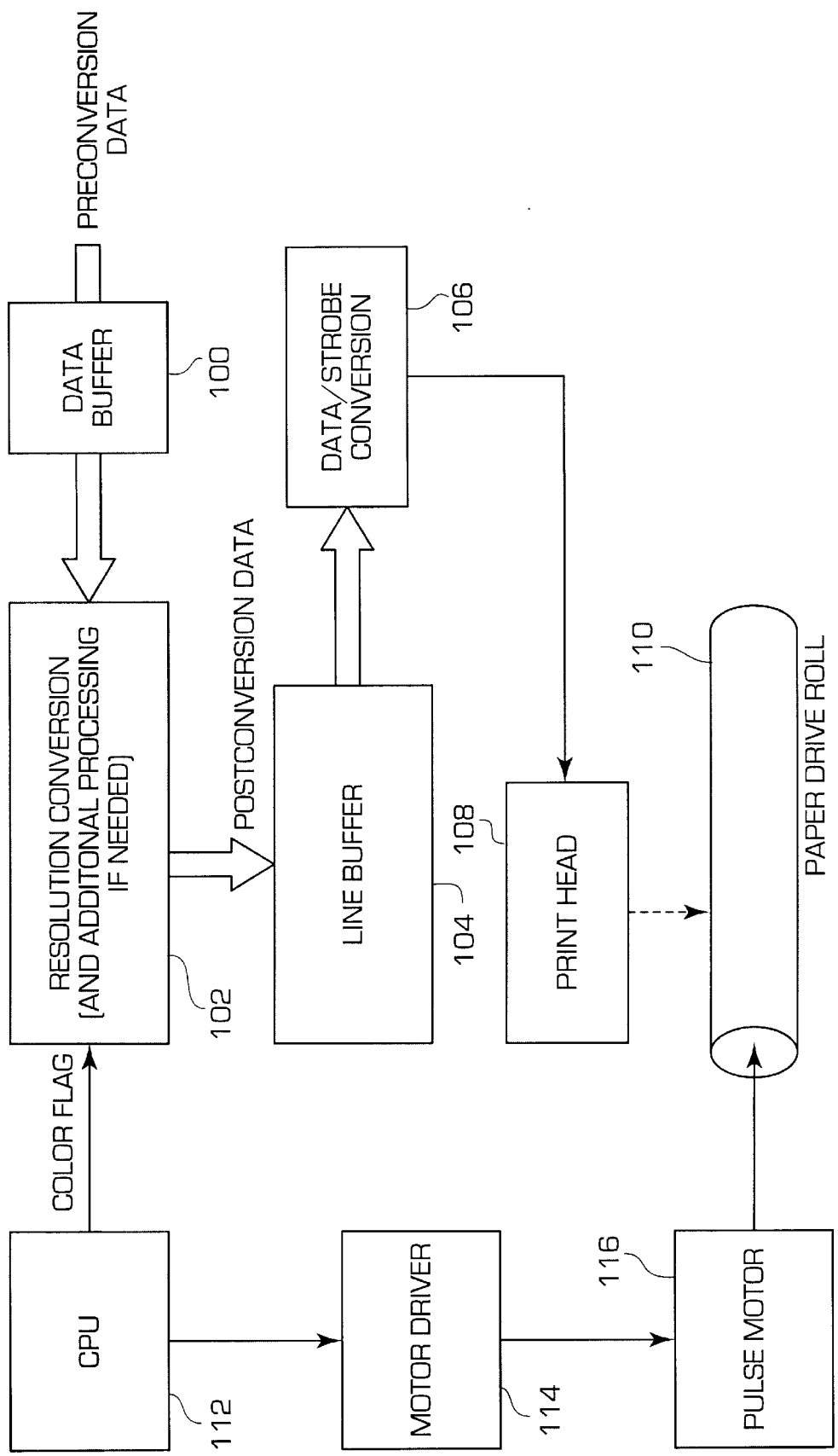
FIG. 16 is a schematic block diagram of the recording apparatus.

Legends:
○: practically usable;
Δ: practically usable depending on applications;
x: outside an allowable range
density: 100% area ratio continuous tone pixel A schematic block diagram of the recording apparatus is shown in FIG. 16, and a flow diagram of 4 color image recording operation is summarized in FIG. 17.

In step 110, the color flag is set to resolution conversion block 102 by the CPU 112 to indicate the one specific color separation image data to be processed. Next, in step 112, the paper position is initialized (reset) to start recording of the indicated color separation, and then, in step 114, the indicated color image data is loaded to the resolution conversion block through data buffer 100. The resolution conversion and additional processing (if needed) are performed for loaded data, and the converted data is loaded to line buffer 104 for printing. In step 118, the line data is printed by print head 108 through data/strobe conversion 106, thus the indicated color image is printed through line by line base operation. During the printing, the rotation speed of the paper drive roll 110 is maintained to be constant by CPU 112 through motor drive 114 and pulse motor 116. If it is determined, in step 120, that there remains other color separation to be printed, the same process is repeated from step 110 for remaining color. If all color separations are printed out, the apparatus feed out the printed paper, and the operation ends.

As shown in Table 1, if the dot pitch ratio for the subscanning direction was set to one consisting of fractional numbers relatively among the respective colors, the color moire was alleviated. In particular, if K was set to a fractional number, the color moire was further alleviated. (See Examples 1 to 3, 8 and 9.)

In addition, if the random arrangement pattern was adopted, the color moire was alleviated, but harsh texture intensified (see Example 4). Here, if the random arrangement was adopted for Y in which the harsh texture was less noticeable, the color moire and the harsh texture were alleviated (see Example 6).

Incidentally Example 3 shows a case in which, in the conventional example in which the angles of arrangement of color-separated dots are changed with respect to the main scanning direction, the dot pitch ratio (i.e., sin 30°: sin 60°: sin 90°: sin15°) for the subscanning direction in a case where the angles of arrangement of Y, M, C, and K are K respectively set to 30°, 60°, 90°, and 15° is adopted only for the subscanning direction.

From the above evaluation, it was possible to obtain substantially satisfactory results in the respective examples in the three-color-separated recording. With the four-color-separated recording, however, satisfactory results were obtained in Example 6 in which the random arrangement was adopted, as well as in Example 8 in which arrangement patterns for Y, M, C, and K were set to the normally arranged pattern, a ¾ arrangement pattern, a ⅗ arrangement pattern, and a ½ arrangement pattern, respectively.

That is, the preferable pattern which gives a satisfactory result without adopting the random arrangement is the pattern in which the dot pitch ratio for the subscanning direction among Y, M, C, and K is set to 1:0.75:0.60:0.50.

Figure 2A:
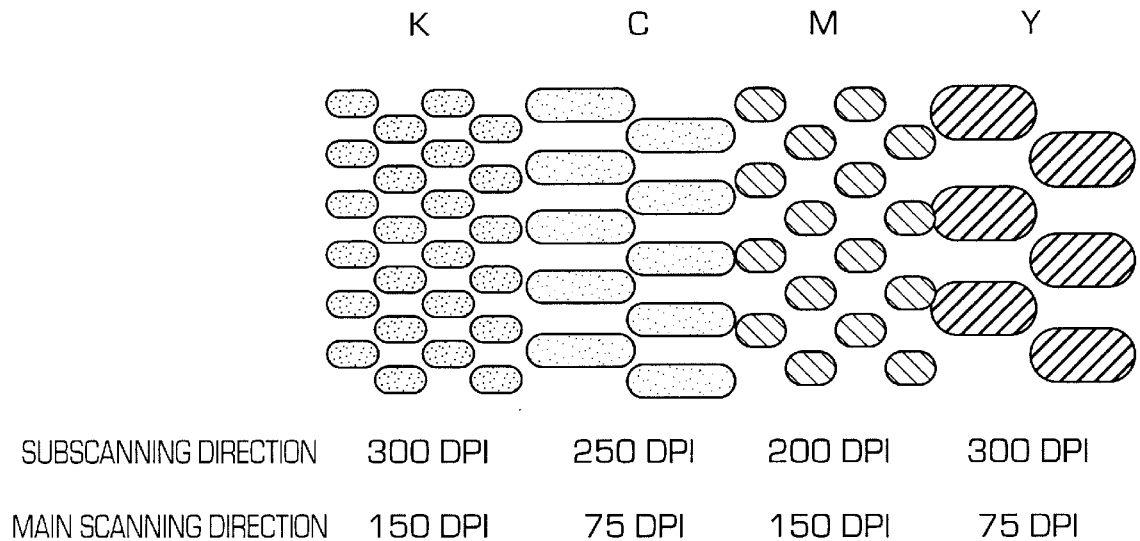
FIG. 2A and FIG. 2B are diagrams illustrating patterns in accordance with an embodiment of the Prior Invention.

Incidentally, Example 8 shows a ratio which is capable of suppressing the color moire to a minimum; however, there are cases where horizontal-lire moire is generated due to the coincidence of a moire cycle depending on an image, as shown in FIG. 2A.

Figure 3:
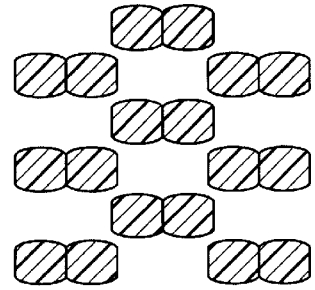
FIG. 3 is a diagram illustrating patterns for avoiding horizontal-line moire.
Figure 3:
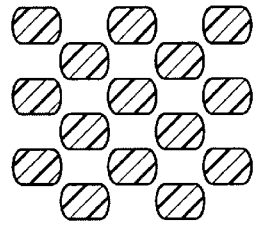
Figure 3:
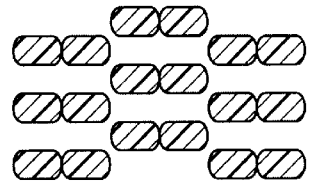
Figure 3:
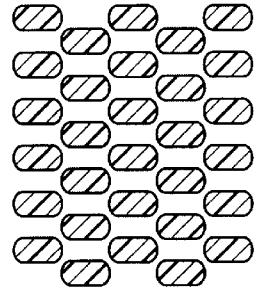

Accordingly, arrangement patterns are adopted in which, as shown in FIG. 3, the pitches of dots in the main scanning direction for Y and C, which have sub-scanning-direction dot pitches set as in Example 8, are set to 2-fold pitches, so as to reduce the resolution by one half.

Namely, arrangement patterns are adopted in which the dot pitch ratio for the subscanning direction among Y, M, C, and K is set to 1:0.75:0.60:0.50, and the dot pitch ratio for the main scanning direction is set to 2:1:2:1. In the dot pitch ratios for the respective scanning directions are taken into consideration, one preferable example of combinations for Y, M, C, and K (the main-scanning-direction dot pitch and the sub-scanning direction dot pitch) are (150 dpi, 300 dpi), (300 dip, 400 dpi), (150 dpi, 500 dpi), and (300 dpi, 600 dDi).

Referring now to FIGS. 4 to 8, a description will be given of the sequence of execution in the case where the dot pitch ratios for the main scanning direction and the subscanning direction among Y, M, C, and K are respectively set to 2:1:2:1 and 1:0.75:0.60:0.50. Incidentally, a description will be given here of the conversion of resolution in the sub-scanning direction.

Figure 4:
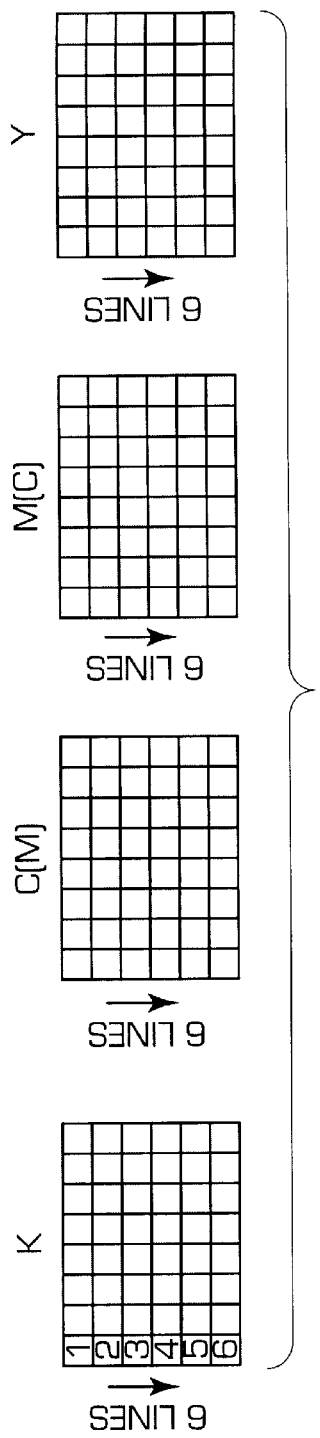
FIG. 4 is a diagram illustrating processing for obtaining arrangement patterns in accordance with the Prior Invention.

First, as show in in FIG. 4, gradation images of the respective colors represented by predetermined normally arranged patterns (e.g., 300 dpi) by means of 8-bit (i.e., 256-gradation) data trains are processed for the subscanning direction by a 6-line cycle for each color. Incidentally if the total number of lines in the subscanning direction of the gradation image is not a multiple of 6, a blank line is added to a final line, so as to set the total number of lines in the subscanning direction of the gradation image to a multiple of 6.

Figure 5:
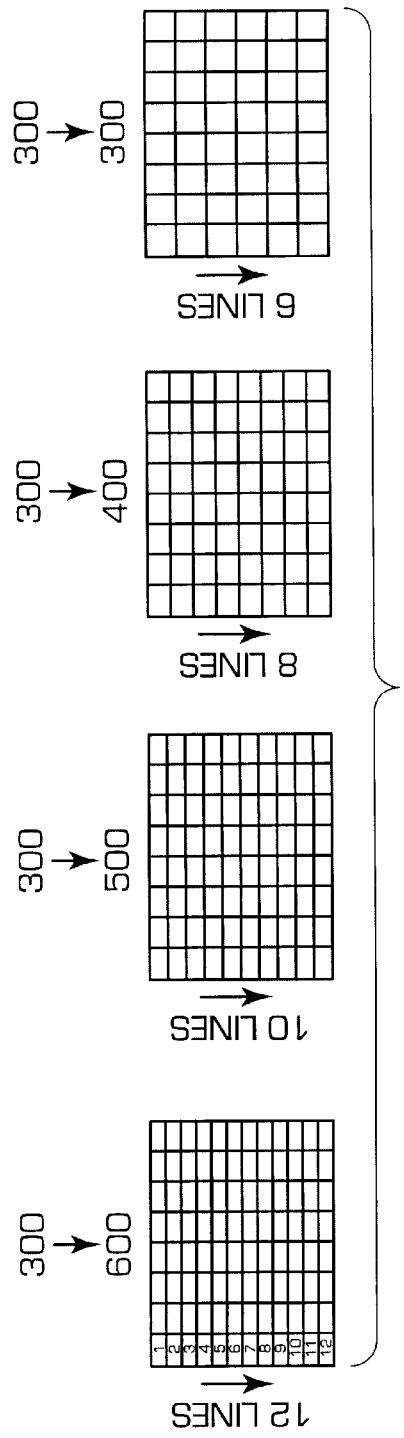
FIG. 5 is a diagram illustrating processing for obtaining arrangement patterns in accordance with the Prior Invention.
Figure 9:
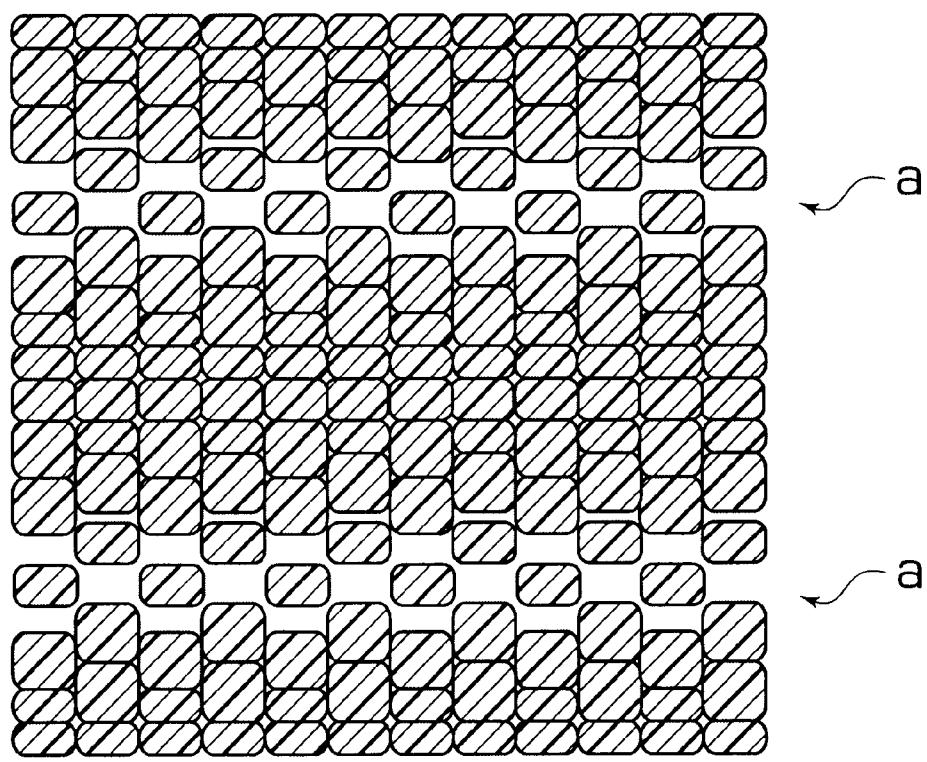
FIG. 9 is a diagram illustrating horizontal line moire.

Next, as shown in FIG. 5, the gradation image data for the subscanning direction is subjected to interpolation processing depending on the position of the gradation image, thereby converting the resolution. In the illustrated example, the resolutions in the subscanning direction of the respective gradation images of Y, M, C, and K represented by, 300 dpi are respectively converted to 300 dpi, 400 dpi, 500 dpi, and 600 dpi. Edges can be made smooth by the conversion into high resolutions.

Incidentally, although the resolution for Y is not converted, an averaging operation is executed in which an average value of a relevant line and and upper adjacent line is set as a value for the relevant line. At this time, a weighting factor of 50% is set to the relevant line and the upper adjacent line, respectively, so as to obtain a weighted average. This arrangement is provided to ensure that the density can be accurately reproduced even if an original image has a checkered pattern. Here, an arrangement may be provided such that the weighting factor for the relevant line is set to 50%, and the weighting factors for the upper and lower adjacent lines are respectively set to 25%, so as to set an average for the relevant line with respect to the upper and lower adjacent lines as being a value for the relevant line.

Formulae for calculating the conversion of the resolution including the averaging operation are shown in Formulae 1 to 4. Incidentally, in this arithmetic operation, since identical processing is repeated for each three lines of the preconversion line data, the number of a line block consisting of three-line data prior to conversion is set to n, and m-th preconversion line data (data train of a one-line portion) within that block is set to line (n, m) (n=0, 1, 2, . . . ; m=0., 1, 2). In addition, upper-adjacent-line data with respect to a first line in processing is set to 0. Data is set to 256 gradations, and data value 0 is set to white, and data value 255 is set to a full density.

Formula 1

In the case of 300 dpi (Y), preconversion data line (n, m) (300 dpi)

to postconversion data line' (n, k) (300 dpi)

line' (0, 0)=0*½+line (0, 0)*½ line' (0, 1)=line (0, 0)*½+line (0, 1)*½ line' (0, 2)=line (0, 1)*½+line (0, 2)*½

.

.

.

line' (n, 0)=line (n−1, 2)*½+line (n, 0)*½ line' (n, 1)=line (n, 0)*½+line (n, 1)*½ line' (n, 2)=line (n, 1)*½+line (n, 2)*½

Formula 2

In the case of 400 dpi (M), preconversion data line (n, m) (300 dpi)

to postconversion data line' (n, k) (400 dpi)

line' (0, 0)=0*⅞+line (0, 0)*⅛ line' (0, 1)=0*⅛+line (0, 0)*⅞ line' (0, 2)=line (0, 0)*⅜+line (0, 1)* p1line' (0, 3)=line (0, 1)*⅝+line (0, 2)*⅜ line' (n, 0)=line (n−1, 2)*⅞+line (n, 0)*⅛ line' (n, 1)=line (n−1, 2)*⅛+line (n, 1)*⅞ line' (n, 2)=line (n, 0)*⅜+line (n, 1)* p1line' (n, 3)=line (n, 1)*⅝+line (n, 2)*⅜

Formula 3

In the case of 500 dpi (C), preconversion data line (n, m) (300 dpi)

to postconversion data line' (n, k) (500 dpi)

line' (0, 0)=0*⅘+line (0, 0)*⅕ line' (0, 1)=0*⅕+line (0, 0)*⅘ line' (0, 2)=line (0, 0)*⅗+line (0, 1)*⅖ line' (0, 3)=line (0, 1)

line' (0, 4)=line (0, 1)*⅖+line (0, 2)*⅗ line' (n, 0)=line (n−1, 2)*⅘+line (n, 0)*⅕ line' (n, 1)=line (n−1, 2)*⅕+line (n, 1)*⅘ line' (n, 2)=line (n, 0)*⅗+line (n, 1)*⅖ line' (n, 3)=line (n, 1)

line' (n, 4)=line (n, 1)*⅖+line (n, 2)*⅗

Formula 4

In the case of 600 dpi (K), preconversion data line (n, m) (300 dpi)

to postconversion data line' (n, k) (600 dpi)

line' (0, 0)=0*¾+line (0, 0)*¼ line' (0, 1)=0*¼+line (0, 0)*¾ line' (0, 2)=line (0, 0)*¾+line (0, 1)*¾ line' (0, 3)=line (0, 0)*¾+line (0, 1)*¾ line' (0, 4)=line (0, 1)*¾+line (0, 2)*¼ line' (0, 5)=line (0, 1)*¼+line (0, 2)*¾ line' (n, 0)=line (n−1, 2)*¾+line (n, 0)*¼ line' (n, 1)=line (n−1, 2)*¼+line (n, 0)*¾ line' (n, 2)=line (n, 0)*¾+line (n, 1)*¼ line' (n, 3)=line (n, 0)*¼+line (n, 1)*¾ line' (n, 4)=line (n, 1)*¾+line (n, 2)*¼ line' (n, 5)=line (n, 1)*¼+line (n, 2)*¾

Next, as shown in FIG. 7, pattern processing is executed in which the gradations of pixels subjected to each color separation after conversion of resolution are allotted to a submatrix, and the values of the submatrix are added to the gradation data after conversion of resolution. The submatrix is arrayed in 2-dot units in the subscanning direction, and the number of offset factors of the submatrix is set in correspondence with the gradation of the image so as to improve the gradation characteristic. For example, the number of offset factors of the submatrix for the mediumtone is set to 4, and the number of offset factors of the submatrix for the highlight is set to 8, so as to improve the gradation reproducibility in the highlight. Incidentally, the sequence of arrangement of the submatrix may be sEt in the same sequence for the entire pixels, or may be set randomly for each pixel. In this example, the case of addition is shown, but subtraction or the joint use of addition and subtraction may be used.

The data of the gradation image is represented by 8 bits so as to represent 256 gradations. Depending on a recording apparatus, however, in the case where 256 gradations are recorded by 8-bit data, there are cases where a substantial recording time is required, or the 256 gradations cannot be recorded.

Accordingly, a predetermined number of bits among the 8-bit data are canceled in correspondence with the number of offset factors of the set submatrix If cancellation is effected, the relationship between the number of bits, n, which are canceled and the number of offset factors, D, o the matrix is defined by D=2n. In addition, cancellation processing is executed with respect to low-order bits in the 8-bit data.

That is, if the number of offset factors of the matrix is 4, the number of bits to be canceled is 2, and two low-order bits in the 8-bit data are set to 0s. If the number of offset factors of the matrix is 8, the number of bits to be canceled is 3, and three low-order bits in the 8-bit data are set to 0s.

Next, as shown in FIG. 8, masks of the illustrated patterns are superimposed on the respective color images, and the gradation data values of pixels corresponding to white portions are set to 0s, while gradation date values of pixels corresponding to black portions are extracted as they are. Incidentally, if the mask operation is executed with respect to a character region of the image, the continuity of gradations is lost. Hence, if the gradation data values of the image having 256 gradations are 255 corresponding to the character, the mask operation is not executed, and the gradation data values of 255 are extracted as they are.

Although in the above-described embodiment cancellation processing is executed with respect to bits of the gradation data in a stage preceding the mask operation, the cancellation processing may be executed in a stage subsequent to the mask operation.

In the aforementioned respective operations, the pattern dither processing and the cancellation processing are not essential items of processing, and are processings for alleviating the burden on the recording apparatus so as to satisfy the number of gradations and the recording speed which can be handled by the recording apparatus. Further, in the special mask operation of 255-gradation data, there are cases where better results are obtained depending on applications even if the mask operation is not performed.

Figure 10:
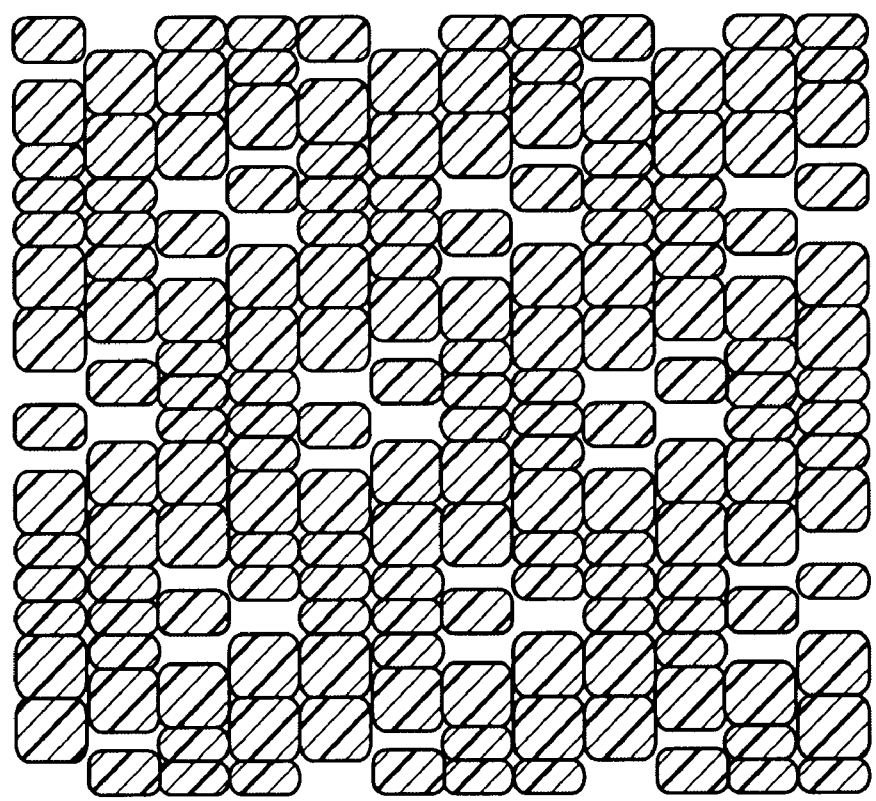
FIG. 10 is a diagram of a pattern in which the various color patterns shown in FIG. 3 are superimposed one on top of another.

FIG. 10 illustrates a state in which patterns corresponding to the respective colors are superimposed one on top of another. As shown, moire cycles are dispersed as arrangement patterns having reduced resolutions in the main scanning direction are combined, thereby making it possible to avoid the aforementioned horizontal-line moire.

The aforementioned arrangement pattern is applicable to one color or two or three colors among the four colors. In addition to being lowered to ½, the resolution in the main scanning direction is set in dot units, as in ⅓ or ¼, and the reductions to the respective sizes are effective, respectively. These conditions are set depending on a image to be recorded.

In addition, in a case where the resolution in the main scanning direction is lowered, two adjacent dots in the main scanning direction may be controlled to independent sizes on the basis of data peculiar thereto. That is, the resolution in terms of shape declines, but the resolution of data does not decline. Further, although in this embodiment the two adjacent dots are arranged completely in parallel to each other in the main scanning direction, the dots may be arranged by being slightly offset in the subscanning direction.

The recording means which is capable of avoiding the aforementioned horizontal-line moire is not confined to a recording process based on thermosensitive transfer materials disclosed in Japanese Patent Application Laid-Open No. 7-117359, and is also applicable to various multicolor-image recording processes, including known thermal transfer recording, dye-sublimation thermal transfer recording, thermal color recording (using such as thermo autochrome paper FJX-TV P-20 manufactured by Fuji Photo Film Co., Ltd.), ink-jet recording, electrophotographic recording, color offset printing using such as a lith type film, and so on. In particular, the recording means used in the present invention is suitable to recording processes in which area gradations are adopted.

Although the color moire and the harsh texture were alleviated even if dye-sublimation thermal transfer materials were used and the density gradation was applied to each color, the application is not suitable since the blurring of black characters was observable (see Comparative Example 6). Further, if the ½ arrangement pattern was applied to K alone, the contours of black characters were made sharp as compared to Comparative Example 6 (see Example 9). As for the dye-sublimation thermal transfer materials used, the ink was a dye-sublimation-type A3 super ink sheet CH-791 manufactured by Seiko Instruments Inc., and the paper used was a dye-sublimation-type A3 plain paper CH-895 manufactured by Seiko Instruments Inc.

In addition, if recording is effected in accordance with the above-described embodiment, since harshness factors such as rosette patterns, which are conventionally observable when printing is effected, are reduced, it is possible to obtain an image close to a photograph exhibiting a small amount of harsh texture particularly in the images which are formed by superimposing four color separations of 50% area ratio pixel.

The above-described embodiment is applicable to direct thermal color recording, thermal transfer recording, and dye-sublimation thermal transfer recording in which images are recorded by thermal heads, respectively. The above-described embodiment is also applicable to electrophotographic processes, silver halide photographic processes, and recordings using photopolymer multicolor photosensitive materials in which images are recorded by liquid-crystal array line heads, respectively. The above-described embodiment is further applicable to electrophotographic processes and silver halide photographic processes in which images are recorded by LED line heads or EL line heads, respectively. Incidentally, the above-described embodiment is also applicable to laser recording in a case where an image is recorded on the basis of high-resolution image data in laser recording in the main scanning direction with a high resolution, since the problems which are overcome by the present invention are involved, and also in a case where an image is recorded on the basis of low-resolution image data, since a gradation image is obtained by making the resolution variable.

Further, the above-described embodiment is also applicable to a case where recording is effected on an intermediate medium in addition to direct multicolor printing, so that it is applicable to, for instance, an output device using a lith film or a printing plate.

Although in the above-described embodiment a description has been given of the case of recording an image, the embodiment is also applicable to the case of reading an image using, for instance, a line imaging element array.

In the above-described embodiment, a description has been given of two-dimensional recording in which the directions of one-dimensional arrangement of recording elements are defined as being the main scanning direction and the subscanning direction perpendicular to the main scanning direction. However, it goes without saying that the directions of one-dimensional arrangement of recording elements may be defined as being the subscanning direction and the main scanning direction perpendicular to the subscanning direction.

Figure 2B:
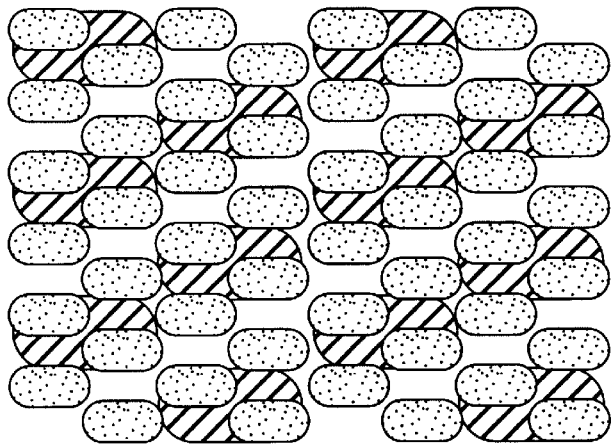

In accordance with the above-described Prior Invention, by varying the dot pitch in the subscanning direction by a desired magnification with respect to each color separation, the color moire is suppressed effectively. Further, by varying the dot pitch with respect to each color separation in the main scanning direction, line moire occurring when a particular image is recorded is avoided. For example, as shown in FIG. 2B where the dot patterns of Y (yellow) and K (black) in FIG. 2A, are superimposed, yellow dots (halftone dots) and black dots (100% density dots) are recorded uniformly in a checker pattern, therefore undesired vertical fringes do not occur.

Figure 12A:
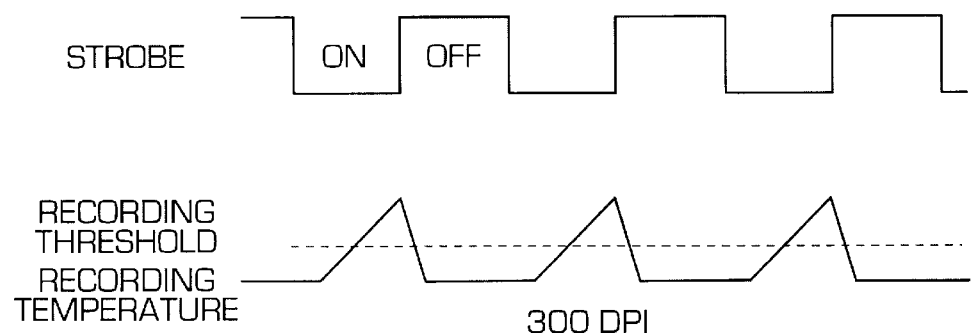
FIG. 12A and FIG. 12B are diagrams illustrating the relation between the strobe and peak recording temperature of the Prior Invention and the present invention.
Figure 12B:
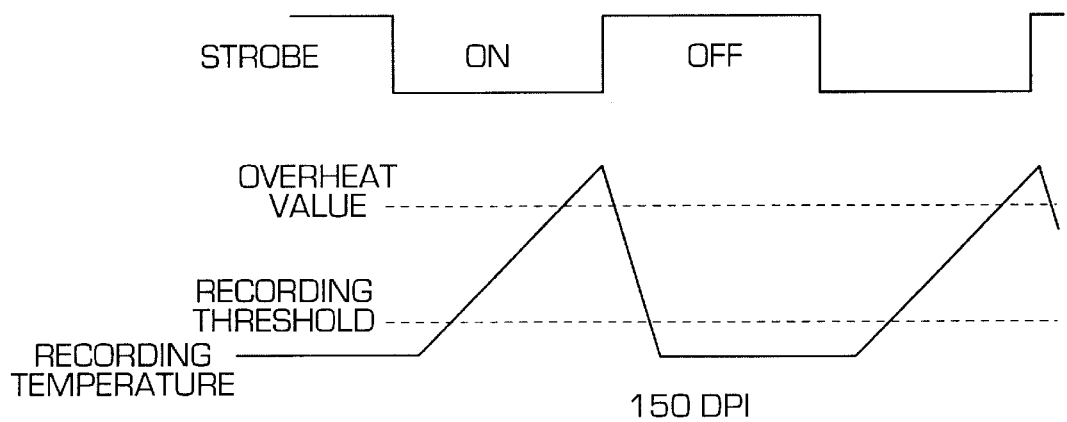

However, in the Prior Invention, as shown in FIG. 2A, because the dot pitch of Y (yellow) in the subscanning direction, i.e. 150 dpi, is half of that of K (black), i.e. 300 dpi, the peak recording temperature of the Y (yellow) dot increases in case of, e.g., 100% density recording. FIG. 12B shows the relation between the strobe and the peak recording temperature in this case of the Prior Invention. As shown in FIG. 12B, in case of 100% density recording, "On" time of the strobe should be increased to obtain high recording head temperature for recording lager dots. In this case, the peak recording temperature exceeds the overheat value to cause the overheat of the center portion of the recording dot, resulting in deterioration of the recording material and deformation of the base, therefore makes it difficult to perform fine recording.

Figure 1B:
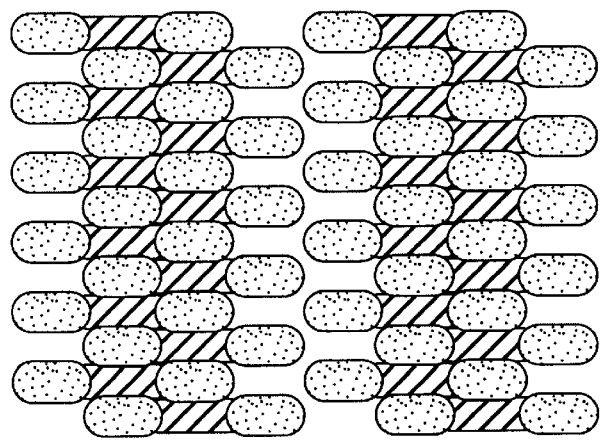

In order to solve the above-described problem, the present invention is implemented as shown in FIG. 1A and FIG. 1B. In FIG. 1A, three colors of black (K), cyan (C), and magenta (M) are processed with same processings as the Prior Invention (FIG. 2A). The difference between FIG. 1A and FIG. 2A is the processing of Y (yellow). According to the present invention, the dot pitch of yellow in the subscanning direction is changed to 300 dpi. By setting the dot pitch of yellow in the subscanning direction to 300 dpi, "On" time of the strobe, even in case of 100% density recording, is reduced to half of that of the Prior Invention as shown in FIG. 12A and FIG. 12B, the peak recording temperature of the recording head does not exceed the overheat value, therefore the center portion of the recording dot is not overheated, which avoids deterioration of the recording material and deformation of the base.

The recording result is shown in FIG. 1B where Y (yellow) and K (black) dot patterns in FIG. 1A are superimposed. The vertical line arrangement of yellow dots (halftone dots) are recorded under the uniform checker pattern of black dots (100% density dots). If the color of the dots of the vertical line arrangement is M (magenta) or C (cyan), its vertical fringes are conspicuous, however, the fringes of the vertical line arrangement of yellow dots are less conspicuous and it is found that the vertical fringes of yellow are acceptable in practical recording. The present invention is based on this fact. Accordingly, fine recording can be performed by the dot patterns of FIG. 1A.

Next, a description will be given of the sequence of execution in the case where th dot patterns of Y, M, C, and K shown in FIG. 1A are recorded. Incidentally, a description will be given here of the conversion of resolution in the subscanning direction.

First, as shown in FIG. 13, gradation images of the respective colors represented by predetermined normally arranged patterns (e.g., 300 dpi) by means of 8-bit (i.e., 256-gradation) data trains are processed for the subscanning direction by a 6-line cycle for each color. Incidentally, if the total number of lines in the subscanning direction of the gradation image is not a multiple of 6, a blank line is added to a final line, so as to set the total number of lines in the subscanning direction of the gradation image to a multiple of 6.

Next, as shown in in FIG. 14, the gradation image data for the subscanning direction is subjected to interpolation processing depending on the position of the gradation image, thereby converting the resolution. In the illustrated example, the resolutions in the subscanning direction of the respective gradation images of Y, M, C, and K represented by, 300 dpi are respectively converted to 600 dpi, 400 dpi, 500 dpi, and 600 dpi. Edges can be made smooth by the conversion into high resolutions.

Formulae for calculating the conversion of the resolution including the averaging operation are shown in Formulae 2 to 4. Incidentally, in this arithmetic operation, since identical processing is repeated for each three lines of the preconversion line data, the number of a line block consisting of three-line data prior to conversion is set to n, and m-th preconversion line data (data train of a one-line portion) within that block is set to line (n, m) (n=0, 1, 2, . . . ; m=0., 1, 2). In addition, upper-adjacent-line data with respect to a first line in processing is set to 0. Data is set to 256 gradations, and data value 0 is set to white, and data value 255 is set to a full density.

Next, as shown in FIG. 7, pattern processing is executed in which the gradations of pixels subjected to each color separation after conversion of resolution are allotted to a submatrix, and the values of the submatrix are added to the gradation data after conversion of resolution.

Next, as shown in FIG. 15, masks of the illustrated patterns are superimposed on the respective color images, and the gradation data values of pixels corresponding to white portions are set to 0s, while gradation data values of pixels corresponding to black portions are extracted as they are. Incidentally, if the mask operation is executed with respect to a character region of the image, the continuity of gradations is lost. Hence, if the gradation data values of the image having 256 gradations are 255 corresponding to the character, the mask operation is not executed, and the gradation data values of 255 are extracted as they are.

Although in the above-described embodiment cancellation processing is executed with respect to bits of the gradation data in a stage preceding the mask operation, the cancellation processing may be executed in a stage subsequent to the mask operation.

In the aforementioned respective operations, the pattern dither processing and the cancellation processing are not essential items of processing, and are processings for alleviating the burden on the recording apparatus so as to satisfy the number of gradations and the recording speed which can be handled by the recording apparatus. Further, in the special mask operation of 255-gradation data, there are cases where better results are obtained depending on applications even if the mask operation is not performed.

What is claimed is:

1. A method of recording an image in which a multicolor image is recorded by moving in a subscanning direction a head having a plurality of recording elements arrayed in a main scanning direction and by making variable a density or an area ratio of each of a plurality of recording pixels in correspondence with a density of an original image, and by combining colors of yellow, magenta, cyan, and black, wherein a pixel for each of the colors is constituted by a cot and/or a blank, the dot having a substantially fixed shape and a variable density, and/or the dot having a substantially fixed density and a variable shape and each of the colors has a dot pitch associated therewith, comprising the step of:

in the subscanning direction, setting the dot pitches of yellow and black equal and setting the dot pitches of magenta and cyan larger than the dot pitches of yellow and black by a predetermined value.

2. A method according to claim 1, wherein a dot pitch ratio of the colors, yellow, magenta, cyan, and black, in the subscanning direction is set to 1:1.2:1.5:1 or 1:1.5:1.2:1.

3. A method according to claim 1, wherein a dot pitch ratio of the colors, yellow, magenta, cyan, and black, in the main scanning direction is set to 2:1:2:1 or 2:2:1.1:1.

4. A method according to claim 2, wherein a dot pitch ratio of the colors, yellow, magenta, cyan, and black, in the main scanning direction is set to 2:1:2:1 or 2:2:1.1:1.

* * * * *